United States Patent
Lotens et al.

(10) Patent No.: US 6,336,958 B2
(45) Date of Patent: Jan. 8, 2002

(54) METHOD FOR PURIFYING GAS LOADED WITH DUST

(75) Inventors: Jan Pieter Lotens, Apeldoorn; Jacob Hendrik Obbo Hazewinkel, Zoetermeer; Abraham Barend Van Der Giesen, Numansdorp, all of (NL)

(73) Assignee: Droan B.V. (NL)

( * ) Notice: Subject to any disclaimer, the term of this patent is extended or adjusted under 35 U.S.C. 154(b) by 0 days.

(21) Appl. No.: 09/728,251

(22) Filed: Nov. 30, 2000

Related U.S. Application Data

(63) Continuation of application No. 09/027,375, filed on Feb. 20, 1998, now abandoned.

(30) Foreign Application Priority Data

Feb. 21, 1997 (NL) .............................................. 1005342

(51) Int. Cl.⁷ .......................... B01D 46/00; B01D 47/06
(52) U.S. Cl. ........................... 95/196; 95/205; 95/214; 95/230; 423/210
(58) Field of Search ......................... 95/187, 195, 196, 95/205, 214, 230, 233, 235, 273, 286; 423/240 R, 243.01, 243.08, 210

(56) References Cited

U.S. PATENT DOCUMENTS

| | | | |
|---|---|---|---|
| 3,456,622 A | * | 7/1969 | Thornton et al. |
| 3,615,199 A | * | 10/1971 | Terrana et al. |
| 3,656,440 A | * | 4/1972 | Grey |
| 3,667,191 A | * | 6/1972 | Prince et al. |
| 3,668,833 A | | 6/1972 | Cahill, Jr. |
| 3,852,409 A | * | 12/1974 | Martin et al. |
| 3,923,478 A | * | 12/1975 | Fiedler |
| 4,000,991 A | * | 1/1977 | Melin, Jr. et al. |
| 4,138,231 A | * | 2/1979 | Hedenas et al. |
| 4,141,701 A | * | 2/1979 | Ewan et al. |
| 4,301,128 A | | 11/1981 | Hastrup |
| 4,305,909 A | * | 12/1981 | Willett et al. |
| 4,314,830 A | * | 2/1982 | Skiven et al. |
| 4,552,732 A | * | 11/1985 | Hillekamp |
| 5,039,315 A | * | 8/1991 | Liao et al. |
| 5,076,818 A | * | 12/1991 | Jonsson |
| 5,108,469 A | * | 4/1992 | Christ |
| 5,599,508 A | * | 2/1997 | Martinelli et al. |
| 5,626,651 A | * | 5/1997 | Dullien |
| 5,792,238 A | * | 8/1998 | Johnson et al. |

FOREIGN PATENT DOCUMENTS

| | | |
|---|---|---|
| DE | 4237228 | 5/1994 |
| DE | 4444809 | 11/1995 |

\* cited by examiner

Primary Examiner—David A. Simmons
Assistant Examiner—Fred Prince
(74) Attorney, Agent, or Firm—Webb Ziesenheim Logsdon Orkin & Hanson, P.C.

(57) ABSTRACT

A Method for purifying gas loaded with dust particles of various sizes, which method includes the following steps:

(a) the gas loaded with dust particles is subjected to wet gas scrubbing at or above the dew point, during which operation any acid gaseous components present in the gas are absorbed and the major proportion of coarse dust particles having a size of $\geq 50$ $\mu$m is removed by a scrubbing liquid, after which (b) the remaining dust particles present in the gas are collected at or above the dew point in an installation for removing dust from gas, purified gas being obtained.

17 Claims, 2 Drawing Sheets

METHOD FOR PURIFYING GAS LOADED WITH DUST

CROSS-REFERENCE TO RELATED APPLICATIONS

This application is a continuation of application Ser. No. 09/027,375, filed Feb. 20, 1998 now abandoned.

BACKGROUND OF THE INVENTION

The present invention relates to a method for purifying gas loaded with dust, a purified gas being obtained.

There are many different ways of processing waste. Processing by combustion is currently widely used. Other possibilities are pyrolysis and gasification, both of which can also be followed by a (s)melting step. In the case of pyrolysis, the waste is heated under (virtually) oxygen-free conditions at temperatures of between 350° C. and 700° C., gases and a coke-like residue being produced. The higher molecular weight constituents can be removed from the resulting gas by cracking at temperatures of about 1100° C. A mixture of $CO$, $CO_2$, $H_2O$ and $H_2$ is produced on cracking. In the case of gasification (,) more oxygen is added and usually temperatures of up to 900° C. are used. Predominantly CO is produced and little coke-like residue forms. The said residues also contain the inorganic constituents from the waste. A (s)melting step at temperatures of about 1400° C. can convert these residues into a usable slag and a fly ash which contains the volatile metals/metal compounds. In addition to the said constituents of the gas, the gas will also contain virtually all halides, mainly in their direct acid form. The pyrolysis and gasification processes yield, as product gas, a fuel gas that still has a calorific value. The same applies to the off-gas from the (s)melting step, at least if the latter is operated under reducing conditions.

In both pyrolysis gas and smelter gas the solids are generally present in two different types: the directly entrained original or slightly melted material (the so-called "entrainment") and the fly ash that is produced from the vaporised metals or metal compounds present in the gas phase. The entrainment contains substances such as lime and silica and is coarser than the fly ash.

In the existing processes for purifying smelter gas and pyrolysis gas the gas is usually fed successively through a gas condenser, a cyclone and/or bag filter to capture solids and through a gas scrubber to remove the acid constituents from the gas. Such processes have the disadvantage that the fly ash obtained frequently still contains acid constituents adsorbed thereon, as a result of which further processing and/or use of the fly ash is rendered more difficult. Moreover, the fly ash is mixed with the entrained material (the entrainment). Furthermore, in the existing processes the fly ash is usually obtained in wet form, as a result of which an additional drying step is necessary.

In connection with the above reference can be made to DE 42 37 228 A1. In this literature reference (,) medical waste is treated together with laundry/dry cleaning waste products in a pyrolysis installation with an after-burner. After first being used to generate steam, the gas obtained from the after-burner is fed into a gas scrubber in which the gas is cooled to below the dew point and freed from HCl constituents. Water loaded with waste substances is thus obtained. After reheating the scrubbed gas to 100–120° C. it is fed to a dust collector such as a bag filter and then to a coke filter. The filter cakes, salts and spent coke materials obtained with this method are finally dumped in a special dump.

A further publication cited is U.S. Pat. No. 4,301,128, in which a somewhat complicated method for the selective purification of gases, in particular exhaust gases containing both solid and gaseous impurities, is described. According to this known method, such a gas is first passed through a separator for solid impurities, for example an electrostatic precipitator, in which about 90% of the fly ash is collected;

the partially purified gas is then fed to a spray dryer, in which the gas is treated with an absorbent, for example a calcium hydroxide solution in water, to remove the gaseous impurities; and is finally passed through a third separator, such as a bag filter, by means of which the remaining quantity of solid impurities is removed from the gas stream, so that ultimately a gas free from solid and gaseous impurities is obtained.

The final citation U.S. Pat. No. 3,668,833 relates to a method for purifying off-gases, which method is made up of a large number of steps, specifically steps (e)–(j) in claim 1:

(e) passing the off-gases through a coarse filter system;

(f) after-burning the particles and gases in the off-gas issuing from (e);

(g) collecting particles from said off-gas with the aid of an electrostatic collector;

(h) scrubbing the off-gas with water of an alkaline pH to remove the acid gases;

(i) subsequently scrubbing the off-gas with neutral water; and (j) passing the off-gas ultimately obtained through a second filter system.

The aim of the present invention is to provide a method which can be carried out in a simple manner, which overcomes the above disadvantages and which therefore yields a fly ash (i) which contains no or hardly any adsorbed acid constituents, as a result of which it is easier to process or to re-use, (ii) which contains no or hardly any entrainment, as a result of which the concentration of valuable metals in the fly ash is higher, and (iii) which can be obtained dry, so that an additional drying step can be dispensed with and a saving in transport costs for transport to a processing company can be achieved as a consequence of the difference in weight between dry and wet fly ash.

SUMMARY OF THE INVENTION

The above objectives are achieved by first subjecting the gas loaded with dust to wet gas scrubbing and only thereafter to a dust-removing treatment.

The invention therefore relates to a method for purifying gas loaded with dust particles of various sizes, which method comprises the following steps:

(a) the gas loaded with dust particles is subjected to wet gas scrubbing at or above the dew point, during which operation any acid gaseous components present in the gas are absorbed and the major proportion of coarse dust particles having a size of $\geq 50$ μm is removed by a scrubbing liquid, after which (b) the remaining dust particles present in the gas are collected at or above the dew point in an installation for removing dust from gas, purified gas being obtained.

The method according to the invention is in particular very suitable for purifying gases which are relatively heavily loaded with dust, the fly ash preferably being recovered in dry form. The gas loaded with dust, which can be purified by the method according to the invention, is therefore also preferably a smelter gas obtained from the pyrometallurgical treatment of metal-containing waste materials, a pyrolysis gas obtained from the pyrolysis of waste or a mixture of the two. However, other gases loaded with dust, such as flue gas and heating gas, can also be purified using the method according to the invention.

In step (a) of the method according to the invention the acid or acid-forming constituents which are present in the gas, such as HF, HBr and HCl, are removed by means of wet (acid) gas scrubbing. A treatment of this type and equipment suitable for this are known per se. Step (a) of the method according to the invention can therefore also be carried out in manners known per se. Preferably, however, wet scrubbing is carried out in a gas scrubber in which a circulating salt solution, which is kept at a pH of between 3 and 11 and preferably of between 5 and 9, is used as scrubbing liquid. The circulating salt solution is circulated by pumping and is kept at the correct pH by adding a base, for example sodium hydroxide solution or potassium hydroxide solution. The acid constituents present in the gas loaded with dust are absorbed by the salt solution and removed from the wet gas scrubber via a salt solution stream in order to be fed—if necessary after adding a little base—back to the top of the gas scrubber, after which spraying is usually carried out. By this means the acid constituents can be absorbed well by the salt solution.

Advantageously 75% or more, preferably 85% or more, of the entrainment (particle size $\geq 50$ μm, preferably $\geq 100$ μm) (lime, silica) which is present in the gas to be purified is also removed by the salt solution in step (a).

The conditions in the wet gas scrubber are usually so chosen that the major proportion (i.e. more than 90% and preferably more than 95%) of the fine fraction (particle size $\leq 25$ μm, preferably $\leq 10$ μm) of the solid particles passes unimpeded through the wet gas scrubber and is collected only in a downstream installation for removing fly ash (step (b)). This can be achieved by choosing the conditions such that the fly ash present in the gas is not moistened, or is barely moistened, in the gas scrubber, which means that—in contrast to what is generally customary—the gas scrubber has to be operated in a relatively inefficient manner. This can be achieved, for example, in a wet gas scrubber of the "disc and doughnut" type. Preferably, the conditions in the gas scrubber are then also so chosen that during gas scrubbing the flow rate of the gas loaded with dust is greater than 1 m/s, preferably 2 to 15 m/s, and that the scrubbing liquid is used in the form of liquid droplets of a size of at least 0.3 mm, preferably of at least 1 mm. A small proportion of the solid particles will, however, usually still pass into the salt solution.

In view of the fact that the salt concentration in the circulating salt solution becomes increasingly higher the greater the number of times the solution is circulated by pumping, it is generally preferable periodically or continuously to replace some of the scrubbing liquid (or salt solution) used by water and, after filtration, to evaporate it in a salt crystalliser, resulting in a salt cake. The salt concentration of the circulating salt solution can, for example, be determined by means of density measurements. The filtration is needed to remove the dust particles present from the spent scrubbing liquid and can very suitably be performed in a filter press. The dust particles filtered off form a filter cake, which can be reprocessed in a melting process or can be combined with the fly ash for further processing. The filtered and purified liquid stream is fed to the salt crystalliser for evaporation. Incidentally it is also possible to re-use part of this liquid stream to top up the scrubbing liquid circulating through the gas scrubber.

Evaporation in the salt crystalliser results in the formation of a salt cake and a liquid which, inter alia, contains the base used to keep the pH of the scrubbing liquid at the desired value. Said liquid can be re-used in the gas scrubber to keep the pH of the circulating scrubbing liquid at the desired value. The salt cake obtained can be worked up further, for example by recrystallisation.

Use of the salt crystallisation described above in the method according to the invention has the advantage that little or no effluent is produced. Specifically, if no salt crystallisation were to take place, the scrubbing liquid which at a specific salt concentration is replaced by fresh water or process water would be discharged as an effluent stream. External purification operations are needed to treat said effluent stream, with the result that, in addition to the discharge levies, additional costs are also incurred for effluent treatment. Furthermore, said effluent, of course, constitutes pollution of the environment.

As has been stated, the major proportion of the solid particles pass unimpeded through the gas scrubber. Said particles thus leave the gas scrubber in the form of a gas which is loaded with dust and from which acid constituents have been removed. Said gas is further treated in a downstream installation for the removal of fly ash. It has been found that it is preferable to keep the gas, loaded with dust, which is obtained in step (a) at a temperature higher than 100° C., therefore at or above the dew point, preferably between 150 and 300 ° C. This prevents the water vapour present from condensing and giving rise to agglomeration of the fly ash. The latter is undesirable with a view to efficient removal of dust in step (b).

In step (b) of the method according to the invention, the dust is removed at or above the dew point from the gas loaded with dust, which has been obtained in the preceding step (a). This is effected by feeding the loaded gas through a suitable installation for the removal of dust from gas. Such installations are known per se. In principle, the known dust removal installations can be used with the method according to the invention. Of these installations, an installation which contains one or more filters is to be preferred. Such an installation usually comprises a vessel which has a funnel-shaped, tapered bottom, in which one or more bags (the filters) are suspended. Said bags are made of a material, usually textile, which is permeable to gas but not to (fly) dust. The loaded gas is fed over the filters, the dust particles not being able to pass through the filter and being removed via the funnel-shaped bottom of the installation in the form of a metal concentrate. The gas passes into the filters and is discharged therefrom.

The gas from which dust and acid components have been removed which is thus obtained (the purified gas) can optionally be further purified by passing it over a bed of active charcoal in order to remove mercury and final traces of organic impurities and/or by subjecting it to a further gas treatment to remove sulphur-containing components, such as $H_2S$, COS and $SO_2$. A number of known processes can be employed for this purpose, such as absorption in an oxidising liquid (such as, for example, in the Sulferox® process) or via adsorption on a fixed bed, such as beds containing zinc oxide. Further treatments of this type are known. Furthermore, water can be removed from the gas by cooling the gas to below 100° C. Some of the water present in the gas will then condense. The degree to which this takes place is dependent on the temperature and the water vapour pressure. The final gas is rich in CO and $H_2$ and is therefore very suitable for use as synthesis gas.

The fly ash or the metal concentrate obtained is obtained in the dry form and usually contains oxides of metals such as zinc, cadmium and lead. Because the acid gases and the entrainment have already been removed in the wet scrubbing step (a), the concentration of metals is relatively high and the metal oxides are present in relatively pure form. This renders further processing of the fly ash easier and increases the value of the fly ash. Because the fly ash is obtained in dry form, no further drying step is needed.

BRIEF DESCRIPTION OF THE DRAWINGS

The invention is further illustrated with reference to FIGS. 1 and 2.

DESCRIPTION OF THE PREFERRED EMBODIMENTS

Figure 1:
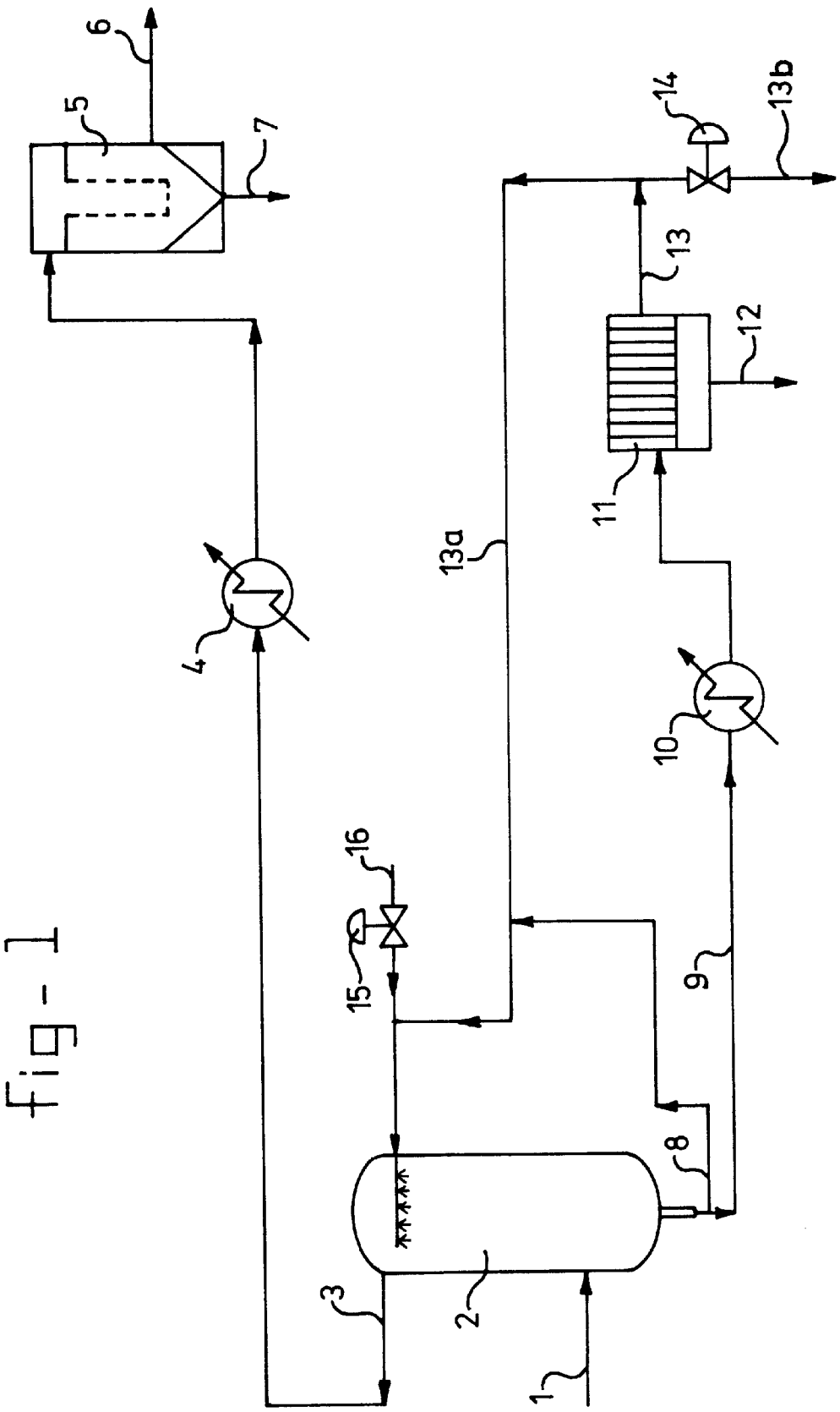
FIG. 1 shows a diagrammatic representation of the method according to the invention.

In FIG. 1 (,) the gas 1 loaded with dust is fed into the gas scrubber 2, where acid or acid-forming constituents present in the loaded gas are removed by bringing the gas into contact with salt solution 13a, to which alkali 16 can, if necessary, be added by metering via valve 15 in order to bring the salt solution 13a to the correct pH. The gas stream 3 which is loaded with dust and from which acid constituents have been removed leaves the gas scrubber and is then fed into a filter installation 5 in which one or more dust filters are present. A heat exchanger 4 can optionally be employed between the gas scrubber 2 and the filter installation 5 in order to heat the scrubbed gas 3 somewhat, so that no condensation of water will take place in the dust filters of the filter installation 5. The gas 1 loaded with dust can optionally be heated by means of a heat exchanger before it is fed into the gas scrubber 2, so that the temperature of the discharging gas stream 3 is higher. In this case heat exchanger 4 is superfluous. Following filtration in the filter installation 5, the purified gas 6 and a metal concentrate (fly ash) 7 are obtained. Solid particles are removed from the contaminated salt solution ("brine suspension") 9, which is obtained from the gas scrubber 2, in a filter installation 11, optionally after cooling in a heat exchanger 10. The purified liquid stream 13 thus obtained passes back to the gas scrubber (salt solution 13a) or is discharged for further processing (stream 13b). This can be controlled by means of valve 14. The moist filter cake 12 which is also obtained is further treated and could, for example, be fed to a smelting installation. A portion of the contaminated salt solution 9 (stream 8) can be recycled directly to the gas scrubber via the salt solution 13a.

Figure 2:
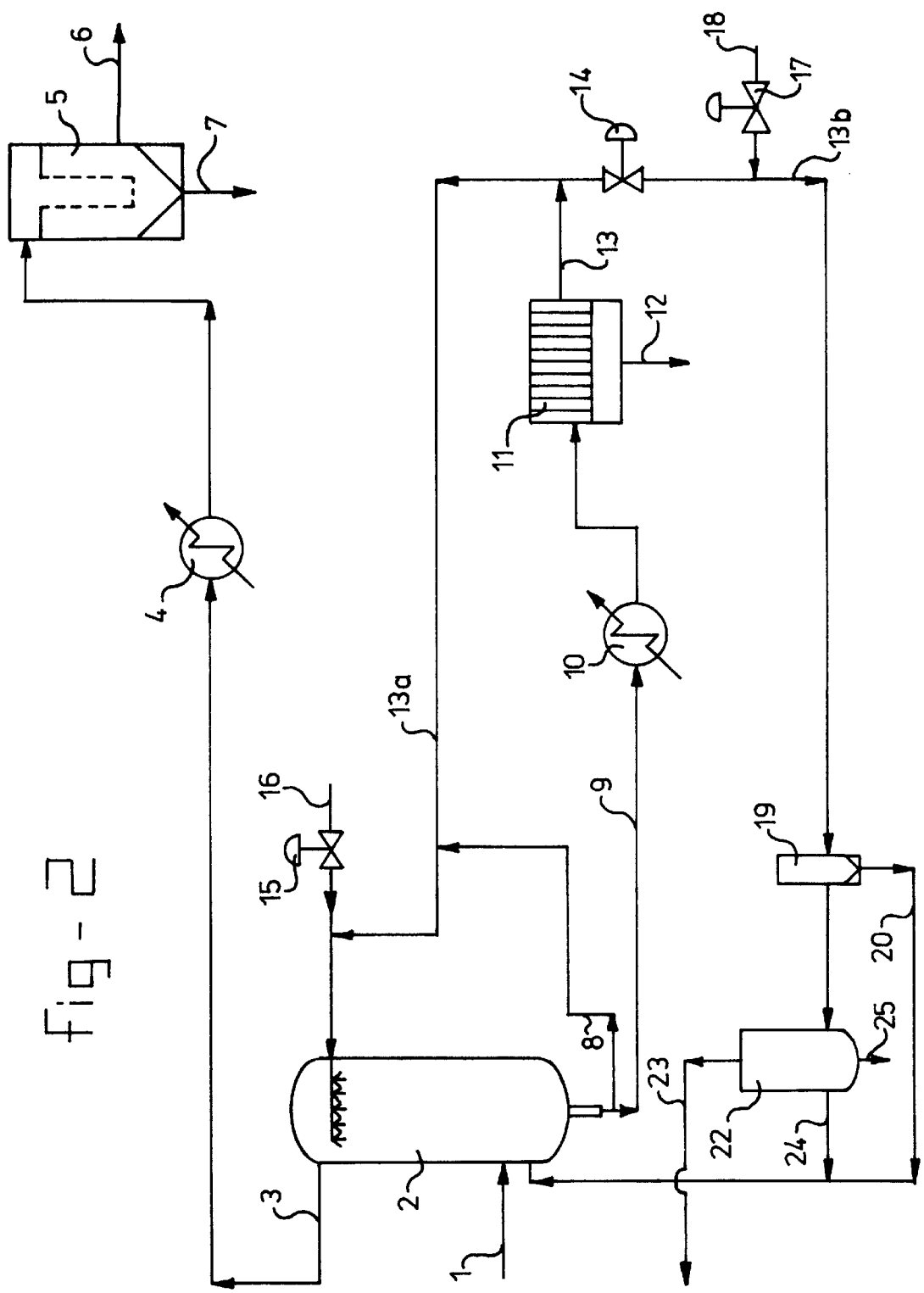
FIG. 2 shows a further embodiment of the method according to the invention, in which the use of salt crystallisation has been incorporated.

FIG. 2 shows a more extensive version of the method as illustrated in FIG. 1. It is indicated in FIG. 2 that the purified salt solution 13b can be further treated by feeding it via a filter installation 19 (ultrafiltration or microfiltration) to a salt crystalliser 22. The pH of the purified salt solution 13b is raised to a value of 10–12 by adding alkali 18 via valve 17. The permeate which issues from the filter installation 19 is then fed into the salt crystalliser 22. Stream 20, which contains the precipitated metal hydroxides, is fed to the bottom of the gas scrubber 2 and thus ultimately passes, via the contaminated salt solution 9, into the moist filter cake 12. Because the heavy metals have been removed from the purified salt solution 13b, the salt cake 25 obtained from the salt crystalliser 22 is a usable product and can, for example, be used as road salt. An alkaline solution 24, which can be recycled to the gas scrubber 2, and a small volume of vapour 23 are also obtained from the salt crystalliser 22. Said vapour stream can optionally be added to a larger gas/vapour stream elsewhere in the process, for example to the purified gas 6 downstream of the filter installation 5.

What is claimed is:

1. A method for purifying gas loaded with dust particles of various sizes, which method comprises the following steps:

subjecting the gas loaded with dust particles to wet gas scrubbing at or above a dew point, during which operation acid gaseous components present in the gas are absorbed, the major proportion of coarse dust particles having a size of 50 $\mu$m is removed by a scrubbing liquid, and the major portion of dust particles having a size of less than 10 $\mu$m passes unimpeded by the scrubbing liquid, and collecting the remaining dust particles present in the gas at or above the dew point in an installation for removing dust from gas, purified gas being obtained.

2. The method according to claim 1, including removing at least 75% of the coarse dust particles present in the gas in step (a).

3. The method according to claim 2, wherein the gas loaded with dust is a melt gas obtained from the pyrometallurgical treatment of metal-containing waste materials, a pyrolysis gas obtained from the pyrolysis of waste or a mixture of the two.

4. The method according to claim 2, including carrying out step (a) in a gas scrubber in which a circulating salt solution which is kept at a pH of between 3 and 11 is used as the scrubbing liquid.

5. The method according to claim 1, wherein the gas loaded with dust is a melt gas obtained from the pyrometallurgical treatment of metal-containing waste materials, a pyrolysis gas obtained from the pyrolysis of waste or a mixture of the two.

6. The method according to claim 1, including carrying out step (a) in a gas scrubber in which a circulating salt solution which is kept at a pH of between 3 and 11 is used as the scrubbing liquid.

7. The method according to claim 6, including keeping the pH between 5 and 9.

8. The method according to claim 6, including controlling the flow rate of the gas loaded with dust to be greater than 1 m/s during gas scrubbing and using the scrubbing liquid in the form of liquid droplets of a size of at least 0.3 mm.

9. The method according to claim 1, including controlling the flow rate of the gas loaded with dust to be greater than 1 m/s during gas scrubbing and using the scrubbing liquid in the form of liquid droplets of a size of at least 0.3 mm.

10. The method according to claim 9, including controlling the flow rate of the gas loaded with dust to be 2–15 m/s.

11. The method according to claim 9, including using liquid droplets of at least 1 mm.

12. The method according to claim 9, including replacing a portion of the scrubbing liquid periodically or continuously by water and following filtration evaporating the liquid in a salt crystalliser, resulting in a salt cake.

13. The method according to claim 1, including replacing a portion of the scrubbing liquid periodically or continuously by water and following filtration evaporating the liquid in a salt crystalliser, resulting in a salt cake.

14. The method according to claim 1, wherein the temperature of the gas loaded with dust which is obtained from step (a) is higher than 100° C.

15. The method according to claim 14, including obtaining gas loaded with dust from step (a) at a temperature of 150–300° C.

16. The method according to claim 8, including replacing a portion of the scrubbing liquid periodically or continuously by water and following filtration evaporating the liquid in a salt crystalliser, resulting in a salt cake.

17. The method according to claim 1, including using one or more filters in the installation for the removal of dust from gas.

* * * * *